United States Patent
Elder

(10) Patent No.: US 6,797,329 B2
(45) Date of Patent: Sep. 28, 2004

(54) ANTIFOULANT DISPERSANT AND METHOD

(75) Inventor: Sherri Lynne Elder, Sugar Land, TX (US)

(73) Assignee: Baker Hughes Incorporated, Houston, TX (US)

( * ) Notice: Subject to any disclaimer, the term of this patent is extended or adjusted under 35 U.S.C. 154(b) by 148 days.

(21) Appl. No.: 10/286,025

(22) Filed: Nov. 1, 2002

(65) Prior Publication Data

US 2003/0129318 A1 Jul. 10, 2003

Related U.S. Application Data

(60) Provisional application No. 60/345,256, filed on Jan. 3, 2002.

(51) Int. Cl.[7] ................................................. B05D 1/02
(52) U.S. Cl. .......................... 427/421; 106/2; 106/14.5; 106/311; 252/363.5; 516/FOR 156; 516/FOR 157; 516/FOR 160; 516/FOR 162; 516/FOR 163; 516/DIG. 1; 516/DIG. 2; 516/DIG. 5; 516/DIG. 7
(58) Field of Search ............................. 427/421; 106/2, 106/14.5, 311; 252/363.5; 516/FOR 156, FOR 157, FOR 160, FOR 162, FOR 163, DIG. 1, DIG. 2, DIG. 5, DIG. 7

(56) References Cited

U.S. PATENT DOCUMENTS

| | | | |
|---|---|---|---|
| 5,013,468 A | 5/1991 | Benfaremo | 252/47.5 |
| 5,240,469 A | 8/1993 | Poindexter | 44/392 |
| 5,479,818 A | 1/1996 | Walter et al. | 73/116 |
| 5,734,098 A | 3/1998 | Kraus et al. | 73/61.62 |
| 5,849,983 A | 12/1998 | Khatib | 585/867 |
| 5,969,068 A | 10/1999 | Bryant et al. | 526/265 |
| 6,159,547 A | 12/2000 | McMordie et al. | 427/380 |
| 6,270,539 B1 | 8/2001 | Henly | 44/415 |
| 6,294,628 B1 | 9/2001 | Bryant et al. | 526/260 |
| 6,331,603 B1 | 12/2001 | Sivik et al. | 526/307 |
| 2002/0020106 A1 | 2/2002 | Filippini et al. | 44/301 |

OTHER PUBLICATIONS

Degussa.; *RohMax Oil Additives, Storage and Handling: VISCOPLEX® and VISCOBASE®*, pp. 1–7, no date available.

*Primary Examiner*—Bernard Pianalto
(74) *Attorney, Agent, or Firm*—Madan, Mossman & Sriram, P.C.

(57) ABSTRACT

Disclosed is a dispersant that can be used to prevent compressors fouling. The dispersant is particularly useful in applications such as the prevention of fouling of compressor blades in compressors used for ethylene production. The dispersant is an admixture of the reaction product of a polyalkyl polyamine, an alkylphenol, and an aldehyde; and a polyalkyl acrylate polymer.

15 Claims, No Drawings

ANTIFOULANT DISPERSANT AND METHOD

CROSS REFERENCE TO RELATED APPLICATION

This application claims priority from provisional application 60/345,256 filed Jan. 3, 2002.

BACKGROUND OF THE INVENTION

1. Field of the Invention

The present invention relates to an antifoulant dispersant. The present invention particularly relates to antifoulant dispersants for use with centrifugal compressors used for compression in an ethylene process.

2. Background of the Art

Fouling of compressors is a well-known problem in processes using them. The fouling of compressors can cause damage to the compressors as well as plant down time, both potentially very expensive problems. There has been considerable effort spent by industry to prevent such fouling. For example, U.S. Pat. No. 6,159,547 to McMordie, et al., discloses a method for coating turbomachinery having a metal surface to prevent fouling. The steps of the method are applying to the surface a first slurry containing an acidic aqueous medium containing a galvanically active material and phosphate ions, thereby forming a galvanically sacrificial first layer, curing the first layer, applying to the cured first layer an aqueous non-conductive second slurry containing inorganic phosphate or silicate ions, thereby forming a non-conductive second layer, curing the second layer, applying to the cured second layer a liquid sealer composition containing a thermally stable organic polymer and fluorocarbon, thereby forming a top layer, and curing the top layer.

In some processes, the operating conditions under which the compressors are laboring can foul or even erode compressor blades, no matter how well coated the compressor blades may be. For example, U.S. Pat. No. 5,849,983 to Khatib discloses addition of polyisobutylene to a predominantly gaseous stream for preventing the shearing of hydrocarbon droplets in the stream to aerosol sizes. One advantage of this invention is that when the polyisobutylene is sprayed upstream of compressor stations, it functions to prevent fouling and erosion of the compressor blades.

While a polymer can function to prevent fouling, as is disclosed in U.S. Pat. No. 5,849,983 to Khatib, in some processes, it is the formation of polymers that can cause fouling. For example, in an ethylene process, it is the formation of organic polymers that can cause compressor fouling.

Steam cracking of hydrocarbons accounts for virtually all of the ethylene produced worldwide. Hydrocarbons used as ethylene feedstocks range from natural gas liquids including ethane, propane and butane, to petroleum liquids including gas oils and naphtha. In the process of producing ethylene, as the ethylene is produced and purified, small amounts of polymers can form. These polymers are generally considered contaminants and are undesirable in the product ethylene. One point of isolation of such contaminants is the compressors. Due to pressure changes, the contaminants can be isolated as liquids and sent to knockout pots wherein the contaminants are held until sent for recycle or disposal.

SUMMARY OF THE INVENTION

In one aspect, the present invention is a dispersant prepared from a formulation comprising: (a) the reaction product of a polyalkyl polyamine, an alkylphenol and an aldehyde; and (b) a polyalkyl acrylate polymer; wherein the two components are present in a weight ratio of about 2:1.

In another aspect, the present invention is a process for preventing fouling of compressor blades used to compress gasses comprising depositing a dispersant onto blades of a compressor to be protected from fouling, the dispersant being prepared from a formulation comprising: (a) the reaction product a polyalkyl polyamine, an alkylphenol and an aldehyde; and (b) a polyalkyl acrylate polymer; wherein the two components are present in a weight ratio of about 2:1.

It would be desirable in the art of compressing gasses to prevent fouling of compressor blades. It would be particularly desirable in the art of compressing ethylene to prevent fouling of compressor blades while avoiding creating an emulsion in knockout pots.

DESCRIPTION OF THE PREFERRED EMBODIMENTS

In one aspect, the present invention is a process for preventing fouling of compressor blades used to compress gasses. The dispersants of the present invention function to prevent fouling in compressors by forming a film on the surface of the compressor blades that prevents, or at least mitigates, buildup by polymers and other contaminants in the gasses being compressed.

In the practice of the process of the present invention, the dispersants can be applied to compressor blades in any way known to those of ordinary skill in the art of applying such materials to be useful for preventing fouling. Preferably, the dispersants are sprayed onto the compressor blades in the form of an aerosol. More preferably, the dispersants are injected into the gas stream being compressed, upstream of the compressor, as an aerosol that is then carried to the compressor blades by the gas being compressed.

In another aspect, the present invention is a dispersant prepared from a formulation having at least two components. The first component of the dispersant, hereinafter Component A, is the reaction product of a polyalkyl polyamine, an alkylphenol and an aldehyde. The polyalkyl polyamines useful with the present invention have a general formula:

I wherein n is an integer of from 0 to 5. Exemplary amines include, but are not limited to ethylene diamines and tetraethylenepentamine, but any compound having the general formula I can be used to prepare Component A of the present invention.

The alkylphenols useful to prepare the Component A of the present invention have the general formula:

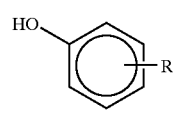

II wherein R is an alkyl group having from 1 to 120 carbons. Exemplary alkylphenols that can be used to prepare Component A of the present invention include but are not limited to anisole, polybutylphenol and nonylphenol, but any alkylphenol having the above general formula can be used.

The aldehydes useful for preparing the first component of the present invention have the general formula:

$$R-\overset{O}{\underset{}{\overset{\|}{C}}}H \qquad III$$

wherein R is H or an alkyl group having from 1 to 6 carbons. Preferably the aldehyde is formaldehyde.

Component A is the reaction product of a polyalkyl polyamine, an alkylphenol and an aldehyde. Component A is preferable a Mannich condensation product formed by condensing the alkylphenol of Formula II with an aldehyde of Formula III and a polyalkyl polyamine of Formula I. The condensation reaction may be conducted at a temperature in the range of about 40° C. to about 200° C. The reaction can be conducted in bulk (no diluent or solvent) or in a solvent or diluent. Water is evolved and can be removed by azeotropic distillation during the course of the reaction. The aldehyde is typically present in a molar amount at least equal to the total molar amount of the amine compounds present. Component A can be prepared by any method known to those of ordinary skill in the art of preparing such reaction products to be useful.

Any ratio of alkylphenol to aldehyde to polyalkyl polyamine that will form a stable reaction product can be used to prepare Component A of the present invention. Preferably, the weight ratio of alkylphenol to aldehyde is from 0.1:1 to 60:1. Preferably the weight ratio of aldehyde to polyalkyl polyamine is from 1:1 to 6:1.

The second component of the dispersant of the present invention is a polyalkyl acrylate polymer. For the purposes of the present invention, the term "acrylate polymers" include polymers having repeating acrylate units, methacrylate units and mixtures thereof. The polymer is preferably a copolymer. These copolymers are typically prepared by first preparing an ester of acrylic acid or methacrylic acid and a $C_1$–$C_{10}$ alcohol and then reacting the ester with a N-vinyl pyrrolidinone or vinylpyridine. For example, VISCOPLEX® 6-917, available from RohMax, is a polyalkyl methacrylate copolymer which can be used as Component B of the present invention.

While copolymers are a preferred embodiment, polyalkyl acrylate polymers are also useful as component B. For example, poly (isodecyl methacrylate) can be used as component B of the present invention. Other polymers having utility as Component B of the present invention include poly (tert-butyl methacrylate), poly (nonyl acrylate), poly (cyclohexyl methacrylate), poly (butyl acrylate) and poly (octadecyl methacrylate).

The polyalkyl acrylate polymers and copolymers useful for preparing component B of the present invention are present in the dispersant compositions of the present invention at a ratio of Component A:Component B of about 2:1. This ratio relates to "active polymer" or polymer weight, not solution weight. For example, the VISCOPLEX 6-917 used in the examples is a solution of 41 percent polymer dissolved in a hydrocarbon solvent. Thus a ratio of Component A:Component B of 10:10 as set fourth in Example 1 is actually an active polymer ratio of 10:4.1 or 2:0.82. For purposes of the present invention, the ratio of Component A:Component B shall be about 2:1 when the weight of each material excluding solvents is present at a ratio of Component A to Component B of from 2:0.5 to 2:1.5. The ranges of from 2:0.8 to 2:1.2 and from 2:0.9 to 2:1.1 are also included within the range of about 2:1.

While the two-component embodiment of the dispersant of the present invention is effective at preventing the undesirable accumulation of polymers on compressor blades, there is a second embodiment of the dispersant of the present invention that also has the desirable property of not creating emulsions with resultant foaming in knockout pots. While this embodiment may not act to break existing emulsions, it does not itself cause emulsions, unlike many other dispersants used for preventing the undesirable accumulation of polymers on compressor blades.

In this second embodiment, the ratio of Component A to Component B remains at about 2:1, but Component A is itself two separate components present in approximately equal weight amounts, Component A1 and component A2. Component A1 is characterized as being a composition that is the reaction product of a polyalkyl polyamine, an alkyl phenol and an aldehyde prepared using a comparatively high molecular weight alkylphenol. For example, Component A1 could be prepared with a compound according to Formula II wherein R is an alkyl group having about 106 carbons. A polybutylphenol wherein the polybutylphenol has 26 repeating butylene units could be used to prepare such a Component A1. The weight ratio of phenol to formaldehyde to amine of such an A1 component can be 60:1:3 while the molar ratio of phenol to formaldehyde to amine can be 2:2:1

Component A2 is characterized as being a composition that it the reaction product of a polyalkyl polyamine, an alkyl phenol and an aldehyde prepared using a comparatively low molecular weight alkylphenol. For example, Component A2 could be prepared with a compound according to Formula II wherein R is an alkyl group having about 9 carbons. A nonylphenol could be used to prepare such a Component A2. For this A2 component, the weight ratio of phenol to formaldehyde to amine can be 3.7:1:1 while the molar ratio of phenol to formaldehyde to amine can be 1:2:1

The dispersants of the present invention are preferably used as a solution in a hydrocarbon. For example, the dispersants of the present invention can be admixed with kerosene, a heavy aromatic solvent, xylene, and the like prior to use to reduce viscosity and ease delivery of the dispersant onto compressor blades. While the solution can be at any concentration, preferably the composition is prepared and used as a from about 70 to about 90 percent, more preferably about 75 to about 85 percent, and most preferably an 80 percent solution of dispersant in solvent.

EXAMPLES

The following examples are provided to illustrate the present invention. The examples are not intended to limit the scope of the present invention and they should not be so interpreted. Amounts are in weight parts or weight percentages unless otherwise indicated.

Example 1

A dispersant of the present invention is prepared by admixing 5 part condensate A1, 10 parts VISCOPLEX® 6-917, 5 parts condensate A2, and 80 parts kerosene. Condensate A1 is a Mannich condensate of tetraethylenepentamine, a polybutylphenol having a molecular weight of about 1438, and formaldehyde. Condensate A2 is a Mannich condensate of ethylenediamine, nonylphenol, and formaldehyde.

The ability of the dispersant to disperse an ethylene gum in a non-solvent is tested. Contaminants from an ethylene compressor are isolated and dried to form a gum. A stock solution of this gum in xylene is prepared.

10 ml of heptanes, a non-solvent for ethylene contaminants, is added to each of three 12.5 ml centrifuge tubes. To each of these tubes is added 125 μL of the stock solution. 0.15 ml of the 20 percent solution of the dispersant in kerosene is added to one of the tubes. 0.75 ml of the 20 percent solution of the dispersant in kerosene is added to another of the tubes. All of the tubes are shaken for 20 seconds and allowed to sit undisturbed for 30 minutes. The tubes are reshaken for 10 seconds and then observed at the expiration of 1 hour from the first shaking.

The tube with no dispersant is observed to have a floc up to the 10 ml mark on the side of the centrifuge tube. The tube with 0.15 ml dispersant added is observed to have a floc up to the 3 ml mark on the centrifuge tube. The tube with 0.75 ml of dispersant is observed to have no floc.

Example 2

A heat exchanger is used to test the ability of the dispersant of the present invention to prevent fouling. A feed stream including diolefins, i.e., butadiene and pentadienes and dicyclopentadiene is fed through the exchanger at 475° F. (246° C.). A dispersant solution of Example 1 is added to the feed stream at 250 ppm volume. Additional runs with higher and lower concentrations are also performed. The temperature of the feed stream exiting the exchanger is measured at the beginning of the experiment and then again after 3 hours. The temperature differential is displayed below in the table.

TABLE

| Dispersant Concentration | ΔT ° F. (° C.) | Percent Inhibition of Fouling |
|---|---|---|
| Blank | 30 (16.6) | — |
| 25 ppm | 19 (10.6) | 37 |
| 250 ppm | 12 (6.7) | 60 |
| 500 ppm | 4 (2.2) | 87 |
| 1250 ppm | 3 (1.7) | 90 |

Example 3

A 1:1 mixture of kerosene and water is shaken to form an emulsion. Sufficient dispersant from Example 1 to make a 500 ppm admixture is admixed with the water and kerosene admixture. It is observed that the emulsion breaks immediately.

Example 4

Example 1 is repeated and tested substantially identically except that a second dispersant prepared using a 41 percent solution of poly (isodecyl methacrylate) (CAS# 37200-12-7) in mineral oil instead of the VISCOPLEX 6-917 is also tested. The blank tube has floc to the 5 ml mark and the tubes containing both dispersants have less than 1 ml of floc.

Example 5

Example 3 is repeated substantially identically except that a second dispersant prepared using a 41 percent solution of poly (isodecyl methacrylate) (CAS# 37200-12-7) in mineral oil instead of the VISCOPLEX 6-917 is also tested. At 500 ppm dispersant in the water and kerosene admixture, no difference is observed between the behavior of the VISCOPLEX 6-917 dispersant and the poly (isodecyl methacrylate) dispersant. In each case there is a quick separation of the kerosene layer.

Example 6

Example 5 is repeated substantially identically except that the dispersants are present at a first concentration of 250 ppm and second concentration of 100 ppm. No difference is observed between the behavior of the VISCOPLEX 6-917 dispersant and the poly (isodecyl methacrylate) dispersant. In each case there is a quick separation of the water and kerosene layers.

What is claimed is:

1. A dispersant prepared from a formulation comprising:
    (a) the reaction product of a polyalkyl polyamine, an alkylphenol and an aldehyde; and
    (b) a polyalkyl acrylate polymer;
   wherein the two components are present in a weight ratio of a:b of about 2:1.

2. The dispersant of claim 1 wherein the reaction product of a polyalkyl polyamine, an alkylphenol and an aldehyde is a Mannich condensate.

3. The dispersant of claim 2 wherein the Mannich condensate is a 1:1 weight mixture of a first Mannich condensate prepared using a comparatively high molecular weight alkylphenol and a second Mannich condensate which is prepared using a comparatively low molecular weight alkylphenol.

4. The dispersant of claim 3 wherein the first Mannich condensate is prepared using a polybutylphenol that has 26 repeating butylene units.

5. The dispersant of claim 3 wherein the second Mannich condensate is prepared using nonylphenol.

6. The dispersant of claim 3 wherein the dispersant does not function as a hydrocarbon emulsifier.

7. The dispersant of claim 1 wherein the reaction product of a polyalkyl polyamine, an alkylphenol and an aldehyde and the polyalkyl acrylate polymer are present at a ratio of 2:0.5 to 2:1.5.

8. The dispersant of claim 7 wherein the reaction product of a polyalkyl polyamine, an alkylphenol and an aldehyde and the polyalkyl acrylate polymer are present at a ratio of 2:0.8 to 2:1.2.

9. The dispersant of claim 8 wherein the reaction product of a polyalkyl polyamine, an alkylphenol and an aldehyde and the polyalkyl acrylate polymer are present at a ratio of 2:0.9 to 2:1.1.

10. The dispersant of claim 1 further comprising a hydrocarbon solvent.

11. The dispersant of claim 10 wherein the hydrocarbon solvent is kerosene.

12. A process for preventing fouling of compressor blades used to compress gasses comprising depositing a dispersant onto blades of a compressor to be protected from fouling, the dispersant being prepared from a formulation comprising:
(a) the reaction product a polyalkyl polyamine, an alkylphenol and an aldehyde; and (b) a polyalkyl acrylate polymer; wherein the two components are present in a weight ratio of a:b of about 2:1.

13. The process of claim 12 wherein the dispersant does not cause foaming in knockout pots receiving materials from the compressor.

14. The process of claim 12 wherein the dispersant is deposited onto the blades of a compressor in the form of an aerosol.

15. The process of claim 14 wherein the aerosol is injected into the gas stream being compressed upstream from the compressor blades.

* * * * *